(12) United States Patent
Murray (10) Patent No.: US 6,474,832 B2
(45) Date of Patent: Nov. 5, 2002

(54) SELF-REGULATING, AXLE-MOUNTED ELECTRICAL GENERATION DEVICE

(76) Inventor: Wayne H. Murray, 31 Laval Place West, Lethbridge, Alberta (CA), T1K 4E9

( * ) Notice: Subject to any disclaimer, the term of this patent is extended or adjusted under 35 U.S.C. 154(b) by 6 days.

(21) Appl. No.: 09/735,789

(22) Filed: Dec. 14, 2000

(65) Prior Publication Data

US 2001/0000305 A1 Apr. 19, 2001

Related U.S. Application Data

(63) Continuation-in-part of application No. 09/378,725, filed on Aug. 23, 1999, now abandoned.

(51) Int. Cl.⁷ ................................................. B60Q 1/00
(52) U.S. Cl. ................... 362/192; 362/478; 362/193; 362/500; 310/750
(58) Field of Search ........................... 362/192, 478, 362/193, 500; 310/67 A, 75 C, 67 R; 340/901, 936, 941, 440; 116/30, 62.1, 56

(56) References Cited

U.S. PATENT DOCUMENTS

| 285,380 | A | | 9/1883 | Bissell |
|---|---|---|---|---|
| 759,511 | A | * | 5/1904 | Ford ........................... 362/478 |
| 1,113,013 | A | | 10/1914 | Johnson |
| 2,422,946 | A | | 6/1947 | Brittain, Jr. |
| 3,130,907 | A | | 4/1964 | Coffey |
| 4,156,131 | A | | 5/1979 | Haines et al. |
| 4,377,975 | A | | 3/1983 | Scott et al. |
| 4,536,668 | A | | 8/1985 | Boyer |
| 4,539,496 | A | | 9/1985 | Thomas et al. |
| 4,539,497 | A | | 9/1985 | Boyer |
| 4,725,928 | A | | 2/1988 | Strepek |
| 5,121,305 | A | | 6/1992 | Deed et al. |
| 5,488,287 | A | | 1/1996 | Kemner et al. |
| 5,577,832 | A | | 11/1996 | Lodhie |
| 5,584,561 | A | | 12/1996 | Lahos |
| 5,585,711 | A | * | 12/1996 | Kemmer et al. ........ 310/156.28 |
| 5,677,667 | A | * | 10/1997 | Lesesky et al. .............. 340/431 |
| 5,753,987 | A | | 5/1998 | Shepherd et al. |
| 5,775,229 | A | * | 7/1998 | Folk et al. ................... 105/136 |
| 5,828,135 | A | | 10/1998 | Barrett |
| 5,828,145 | A | | 10/1998 | Nakamura |
| 5,877,682 | A | | 3/1999 | Groeller |
| 5,902,341 | A | * | 5/1999 | Wilson .................... 246/122 R |
| 6,116,763 | A | | 9/2000 | King |

FOREIGN PATENT DOCUMENTS

CA 2130852 2/1996

* cited by examiner

*Primary Examiner*—Stephen Husar
*Assistant Examiner*—Bertrand Zeade
(74) *Attorney, Agent, or Firm*—Sean W. Goodwin (57) ABSTRACT

A rail-car status-indicating assembly is provided for mounting to the axles of railcars. A solenoid and a magnet are part of the assembly installed each to one of a non-rotating structure and a rotating structure which co-rotates with the axle so that each time the solenoid enters the magnets field a current is induced. Preferably, a housing forms the rotating structure for protecting the inductive components. A bearing and pendulum are mounted within the housing to form a non-rotating structure. Magnetically induced co-rotation is eliminated by mounting of the electrical components to an offset pivoted structure. One form of low-power status device is light emitting diodes, electrically connected to the solenoid for repeated emission of light visible to oncoming motorists. Other embodiments include use of low power temperature sensors and the use of LEDs to transmit two or more status condition or via RF transceivers. Alternatively, the housing forms the non-rotating pendulum structure and the axle rotates a rotary member bearing one of either the solenoid or magnet.

26 Claims, 9 Drawing Sheets

SELF-REGULATING, AXLE-MOUNTED ELECTRICAL GENERATION DEVICE

This is a continuation-in-part of application Ser. No. 09/378,725, filed Aug. 23, 1999.

FIELD OF THE INVENTION

The present invention relates to railcar-mounted warning lights and more particularly to status-indicating assemblies mounted on the wheels of train cars that utilize the rotation of the axle to generate power.

BACKGROUND OF THE INVENTION

It is known that the lack of lighting on railcars presents a serious safety issue for motorists, especially at uncontrolled rail crossings. The sides of train cars are typically unlit. At night, the train locomotive headlights quickly pass the crossing and drivers of vehicles sometimes do not see the railcars and run into the unlit side of the train, resulting in serious injury or death.

The high cost of monitoring and controlling all rail crossings is prohibitive. It would therefore be advantageous to provide warning lights directly on the railcars. However, lack of electrical service onboard the majority of railcars has presented the greatest difficulty with respect to the installation of warning lights. Gas generators and conventional alternators have been tried, however, bulky installation and safety hazards with respect to sparks from carbon brushes have restricted their use.

U.S. Pat. No. 5,828,135 issued to Barrett is known which describes a wheel-mounted generator used to power electrical braking systems, car lighting and other functions requiring electricity. The generator produces electricity through the relative motion of permanent magnets adjacent to stationary coils positioned about the railcar axle. Barrett has addressed the issue of securing coils about the axle, however, it necessitates complex construction and it's power producing capability far exceeds that to power a warning light system and it adds significantly to the cost of installation, considering the large number of railcars.

Boyer, in U.S. Pat. No. 4,539,497 discloses a wheel-mounted generator within a toroidal housing for mounting around a vehicle axle. The generator is suitable to provide power to associated signal transmitters responsive to such apparatus as tire pressure sensors on multi-wheel vehicles. A pendulum is journaled about the housing passage through which the axle passes. A ring gear is mounted to the housing and engages a pinion gear on the generator armature shaft when the housing rotates. The ratio of the gears drives the generator at a rate greater than the wheel rotation rate. A magnet is attached to and rotates with the housing. The armature of the generator remains relatively stationary with respect to the magnet due to the resistance of the gears rather than the weight of the pendulum. Gear-driven generators require significant servicing to ensure replacement of worn gears for continued operation.

In U.S. Pat. No. 5,584,561 to Lahos, utilizes a simple combination of two separate components; a magnet attached to the rotating wheel of a bicycle and a solenoid attached to the fixed bicycle frame. The solenoid's coil is electrically connected to a series of diodes. In operation, the wheel-mounted magnet is repeatedly driven past the solenoid during rotation of the wheel. The magnet's magnetic field generates an alternating current in the solenoid's coil which is fed to a diode bridge where the signal is rectified and fed to an electronic signaling device that produces electronic pulses to electroluminescent diodes. Electrical storage devices are provided for ensuring continued lighting even if the wheel is not rotating.

In the Lahos application, the bicycle has a convenient frame and wheel providing consistent spacing, a generally non-hazardous environment and a positive relative rotation for periodic induction of an electrical current.

In the context of a railcar, the fixed frame portion is not necessarily located in convenient proximity to the rotating components and the potentially damaging heavy industrial environment includes impact hazards and a prevalence of spalled metal from rails and other metal debris. In such industrial settings, an exposed magnet quickly accumulates metal debris which can render it unable to produce sufficient magnetic field to induce an electrical current in a passing solenoid coil. In the rare instances in which the bicycle-mounted magnet of Lahos would accumulate metallic debris, the failure is readily detected and then the magnet can also be easily cleaned by the rider.

In contrast to Lahos' bicycle case, a railway environment is rife with metallic debris which would foul the apparatus of Lahos and, as a train of railcars has few operators, failures are unlikely to be detected in a timely manner. Costs of maintenance would escalate if inductive magnets on all train car wheels required cleaning at each servicing or more frequent servicing to ensure reliable magnetic fields. As well, the need to modify the wheel supports, axles or axle endcaps for installing two separate components would add significantly to the installation costs. One also readily recognizes the inherent delicate nature of the inductive solenoid and magnet arrangement of Lahos and the risk of damage if positioned on the outside of a railcar wheel.

In an earlier attempt to improve the power output of wheel mounted generators, Thomas et al in U.S. Pat. No. 4,539,496 have taught that it is the offset position of the generator from the axis of rotation of the wheel that results in a gear "step-up" of the mechanical driving force of the generator resulting in increased electrical power output.

Further attempts to produce increased amounts of electricity from wheel mounted generators have resulted in the use of multiple sets of coils and magnets, positioned offset the axis of rotation of the wheel, inside a housing. One problem inherent with the offset use of multiple magnet and coil generators is the strength of the attraction of the magnets for the metal core in the coils, which may, if large enough, cause the pendulous mass inside the housing to begin rotating about its axis of suspension, along with the rotating housing, and effectively terminating the objective of generating power.

A number of approaches to prevent co-rotation of the pendulum with the wheel generator housing have been suggested. In recently issued U.S. Pat. No. 6,116,763 to King, an asymmetric weight is attached to the pendulum in much the same way counterweights were used in earlier references for wheel-mounted rotating devices, such as hub odometers. The addition of the counterweight addresses co-rotation caused by frictional drag, but it does not fully address co-rotation caused by the attraction between the magnet and the coil core.

Further, there are other cases in which the rail industry has gone to extraordinary effort to provide indicating apparatus for hot bearings and the like. For instance, it is known to provide hot box detectors adjacent the rails and if the detector spots a hot box (a hot journal or wheel bearings indicating onset of failure) then a signal is sent to a dispatcher who then warns the train operator by radio. Detection of a hot box have conventionally been by infrared detection, based on a measurements taken only as the rail wheel passes a sensor and are thus subject to incorrect readings. Further, the hot box detectors tend only to detect hot boxes near failure, when the temperatures are sufficiently high to ensure detection. Further, sensors in the detectors, such as the bolometer, require a highly stable and accurate high voltage supply. Others, such as pyroelectric cells have a lower power requirement but exhibit a variable response, dependent upon infrared exposure and its strength. If there was an onboard and wheel-powered sensor, then more sensitive data and cumulative readings could be obtained and thus transmit more comprehensive data to a track-side receiver, or to the locomotive.

Clearly, there is a need to provide a reliable, low cost status and warning light system which preferably combines the simplicity and low power requirements of the Lahos system, but is suitable for the rough industrial environment of trains and railcars, prevents co-rotation of the non-rotational elements with the rotational elements, and further meets the need for servicing and safety requirements associated with railcars.

SUMMARY OF THE INVENTION

A self-contained power and status-indicating assembly is provided for mounting on the axles of railcars. In a preferred embodiment, a protective housing is mounted for co-rotation with the axle. A bearing and pendulum are mounted within the housing to form a non-rotating structure. An electromagnetic current induction system comprising a solenoid and a magnet is installed at an eccentric pivot between the non-rotating structure and the rotating housing. Low-power devices are electrically connected to the solenoid for the periodic receipt of battery and line-less power. The housing, pendulum and induction system thus form a simple and inexpensive assembly which is protected from contaminants, is virtually maintenance free and is easily retrofitted to railcar axles.

In one preferred embodiment, the low-power status device is a light, such as a super-bright LED so that solenoid operation results in the repeated emission of light. Other embodiments include temperature and vibration sensors which may be combined with status LED's and infrared or radio transceivers. Radio transceivers, coupled with long storage life batteries, can be used to broadcast a strong and long signal upon detecting the status of a characteristic having a long MTBF.

Therefore, in a broad aspect of the invention, a power generation assembly mounts to the rotating axle of a railcar comprising a rotating structure mounted to the axis of the railcar axle for co-rotation with the axle and a non-rotating structure which is maintained so using an eccentric mounting structure connected to and extending from the non-rotating structure. A bearing rotatably supports the non-rotating structure from the rotating structure. An arm is pivotally connected to the eccentric mounting structure at a position offset the axis of rotation of the axle, thus creating an eccentric axis of rotation. A magnet and a solenoid are mounted to one of either the rotating structure or the non-rotating arm for relative movement and arranged so that the solenoid repeatedly passes through the magnetic field of the magnet as the axle rotates, inducing electrical energy in the solenoid. A low-power consumption device, preferably a light-emitting diode, is connected electrically to the solenoid so that the induced electrical energy causes operation of the device; in the case of the LED, to emit light visible to oncoming motorists and thereby indicating the presence of the railcar. A capacitance circuit can provide continuity of power between induced energy production. Should the non-rotating structure be induced to co-rotate with the rotating structure due to attraction between the magnet and the coil core, the eccentric axis of rotation of the arm causes the magnet and coil to pivot away from one another, thus breaking the attraction and limiting any co-rotation to a small arcuate pendulous motion.

In another preferred embodiment, a low powered device is provided for indicating two or more status conditions via LEDs or RF transceivers. In combination with a hot box detector equipped with a compatible light or RF receiver, railcar status can be directly communicated.

Preferably, a housing is provided for forming a chamber which surrounds the magnet and solenoid for excluding contaminants.

One preferred embodiment provides the housing as the rotating structure. Preferably, the solenoid is mounted to the arm, adding weight to the arms's gravitational resistance to rotation, a counterweight is attached to the eccentric mounting structure to assist in preventing frictionally induced co-rotation of the housing and the generator, and the magnet is mounted to the housing. In this instance, the status-indicating device rotates, and thus is enclosed within the housing. A lens is provided to enable light emission to be visible from without the housing.

In other embodiments, the solenoid may be mounted to the housing and no restriction is imposed on mounting of the status-indicating device, obviating the need for a lens in the case of LED's intended for viewing.

BRIEF DESCRIPTION OF THE DRAWINGS

FIG. 3b is a cross-sectional side view of the rail-car status assembly showing the optional attachment for the counterweight of FIG. 3a;

DETAILED DESCRIPTION OF THE PREFERRED EMBODIMENT

Figure 1:
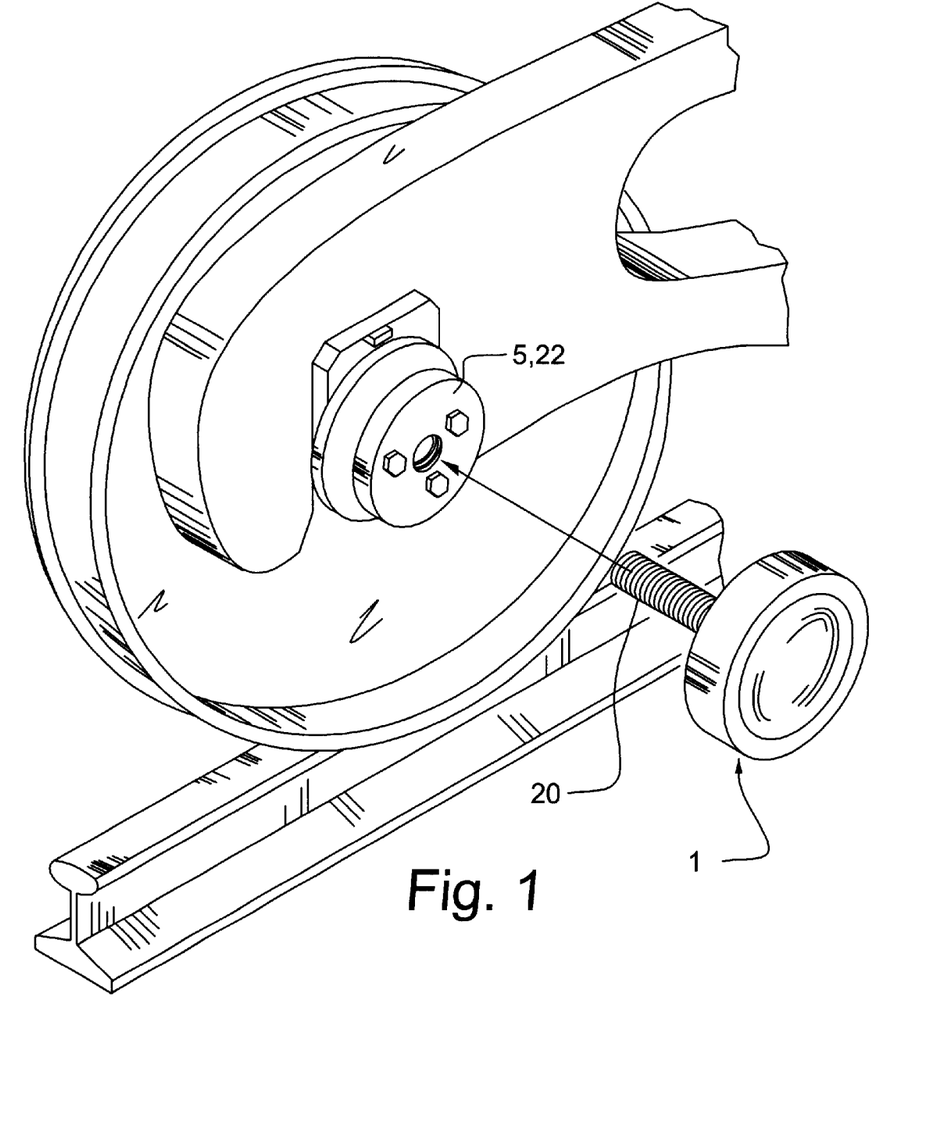
FIG. 1 is a perspective view of a warning light according to an embodiment of the invention and shown in exploded view from a partial view of a railcar wheel.

A rail-car status-indicating assembly 1, as shown in FIG. 1, is provided for mounting to the rotating axles 5 of railcar wheels.

Figure 2A:
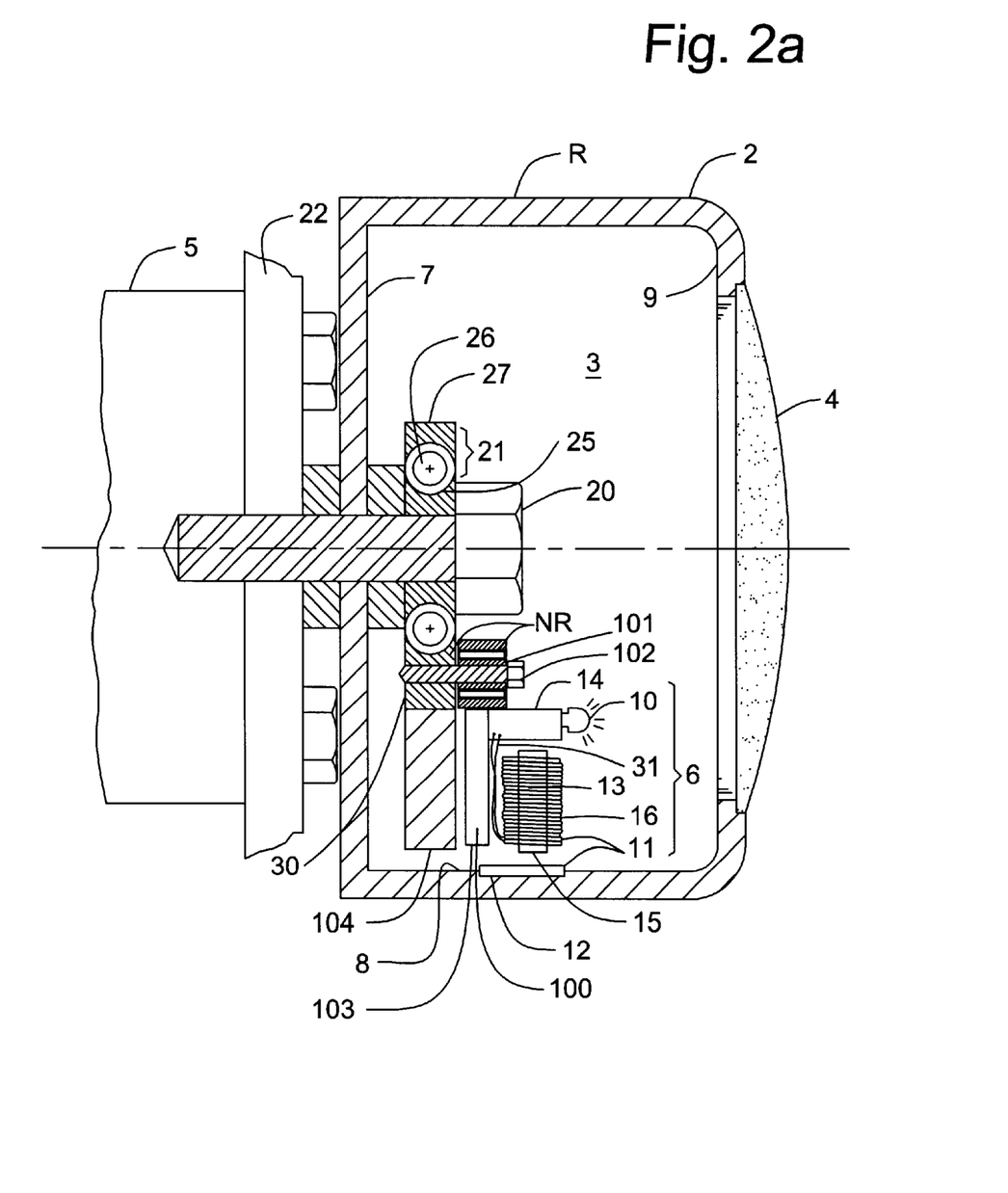
FIG. 2a is a cross-sectional side view of a first embodiment of the rail-car status assembly having a frictional counterweight rigidly attached to the eccentric mounting structure and a coil pivoted eccentrically therefrom.

In a first embodiment, and having reference to FIG. 2a, a lighting device is enclosed within a chamber 3 formed within a housing 2. Housing 2 has an inside wall 7, a circumferential wall 8 and an outside wall 9 for excluding contaminants such as metallic debris.

The rail-car status assembly 1 is a warning light mounted as a single unit to the rotating axle 5 and comprises both a rotating R and a non-rotating NR structure. The rotating structure is driven by the axle. The non-rotating structure is rotatably supported from the rotating structure and remains passively non-rotating through a pendulum effect.

The lighting portion 6 comprises one or more light emitting devices such as super-bright diodes (LED's) 10 electrically connected to an electromagnetic induction system 11. LED's 10 require very small amounts of current to produce electroluminescence. For super bright LEDs, as little as 1.5 Volts and 10–20 mA of power are required. The electromagnetic induction system 11 produces electricity to power the LED's 10 and comprises a magnet 12, a solenoid 13 and a conditioning circuit 14.

The solenoid 13 is generally a device having many turns of windings (a coil 16) wound over a cylindrical form, possibly air but for greater flux density, an iron core 15.

Should the solenoid 13 pass momentarily through the magnetic field of the magnet 12, an electrical current is formed in the coil 16. The momentary current excites the LED or LEDs 10, causing them to flash. If electrical storage is desired, then the electronic conditioning circuitry 14 can be similar to that disclosed in U.S. Pat. No. 5,584,561 to Lahos, to condition the current to excite the LEDs 10 whether the axle 5 is rotating or not. The circuit 14 can include a capacitor which stores excess energy for use between the periodic power induction.

The induction system 11 is protectively mounted within the housing's chamber 3. For LEDs 10 located within the chamber 3, a translucent lens 4 is provided, formed on the outside wall 9 so that light emitted from the LEDs 10 is visible from without the housing 2. It is to be understood that the term translucent includes fully transparent.

Several embodiments are described which depict various combinations of the positioning of the induction system 11. For example, and as described in more detail below, the magnet 12 could be mounted to either the rotating structure R or the non-rotating structure NR. Further, the housing 2 may form either the rotating R or the non-rotating NR structure.

Rotating Housing with Magnet

More specifically, in a first embodiment of the invention and having reference again to FIG. 2a, the magnet 12 is affixed to the housing 2 and the housing 2 is caused to rotate with the axle 5. To minimize imbalance during axle rotation, the housing 2 is concentrically mounted to the axis of the axle 5.

A threaded bolt 20 passes through a bearing 21 and through the housing's inside wall 7 for affixing the entire warning light assembly 1 to the axis of the axle 5. As shown in FIGS. 1 and 2, the axle 5 typically terminates in an endcap 22, which rotates as the axle 5 rotates. The axis of the axle 5 and endcap 22 are tapped for insertion of the threaded bolt 20. This process can be completed quickly during routine servicing of the railcars.

The threaded bolt 20 pins the inside wall 9 against the axle, thereby causing the housing 2 to rotate with the axle 5.

The bearing 21 forms the interface between rotating and first non-rotating R, NR structures of the lighting assembly 1.

Preferably, a low-friction roller bearing 21 is employed, shown as having an inner race 25, rollers or balls 26, and an outer race 27. The inner race 25 is sandwiched between the head of the bolt 20 and the housing 2 so that both the inner race 25 and the inside wall 7 of the housing 2 are secured to the axle 5 for co-rotation therewith. The inner race 25 rotates relative to the outer race 27.

An eccentric mounting structure 30 depends from the bearing's outer race 27, the bearing's outer race 27 and eccentric mounting structure 30 forming the first non-rotating structure NR. The eccentric mounting structure 30 extends downward from the bearing's outer race 27 allowing an arm 100 to be pivotally connected at a position spaced from the axis of rotation of the axle. The arm 100 is pivotally connected by a second bearing 101, preferably a friction roller bearing, and bolt 102.

The solenoid 13, located at the arm's bottom end 103 and the circuitry and LED's 10, attached along the length of the arm 100, provide mass which acts to overcome viscous drag which exists between the inner and outer races 25, 27 of the first bearing, and which attempts to cause the outer race 27 to co-rotate with the inner race 25.

Optionally, a counterweight 104 can be attached to the eccentric mounting structure 30, further counteracting the viscous drag and the tendency to co-rotate. The counterweight 104 moves to the center if it is caused to rotate above the axle therefore losing the momentum that would otherwise multiply on the downward rotation causing the rotating R and non-rotating NR structures to rotate together.

Figure 2B:
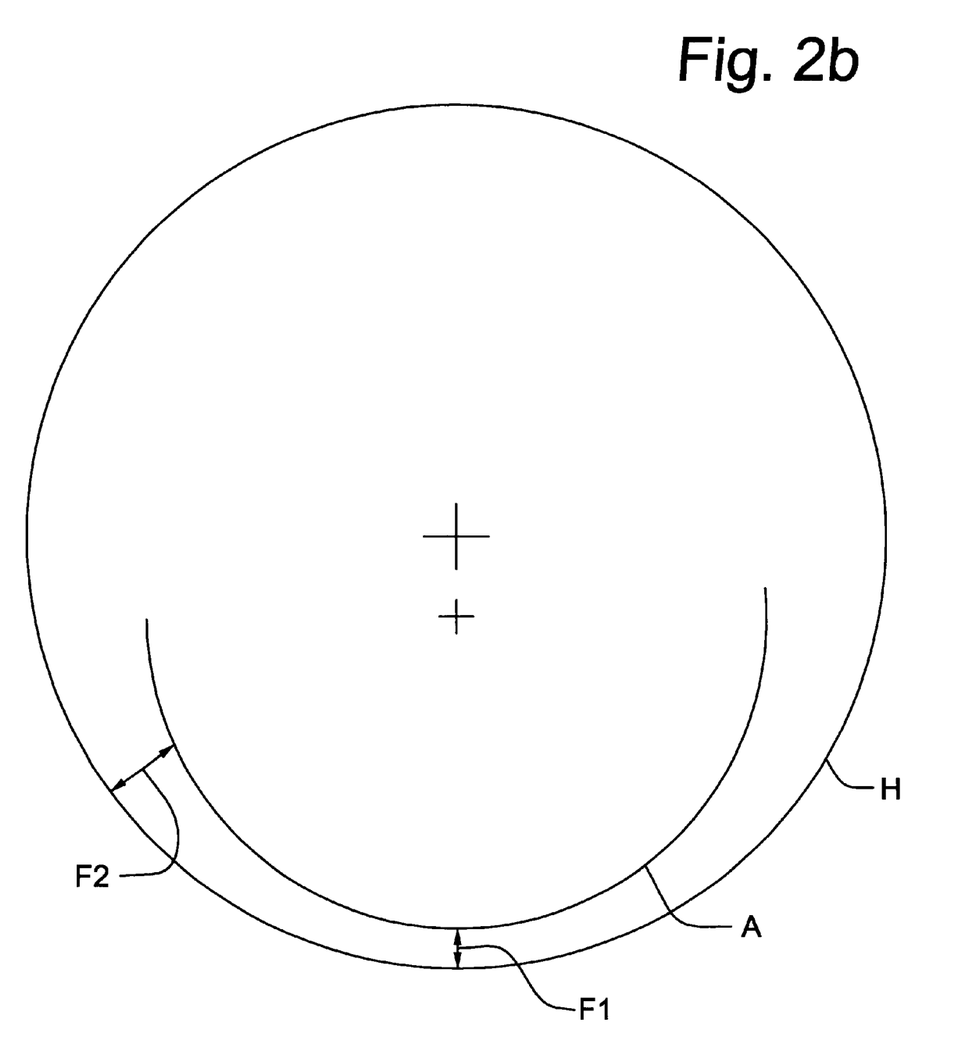
FIG. 2b is a schematic representing two rotational paths for the coil and magnets, one centered about the axle and the other about an eccentric axis of rotation relative to the axle.
Figure 3A:
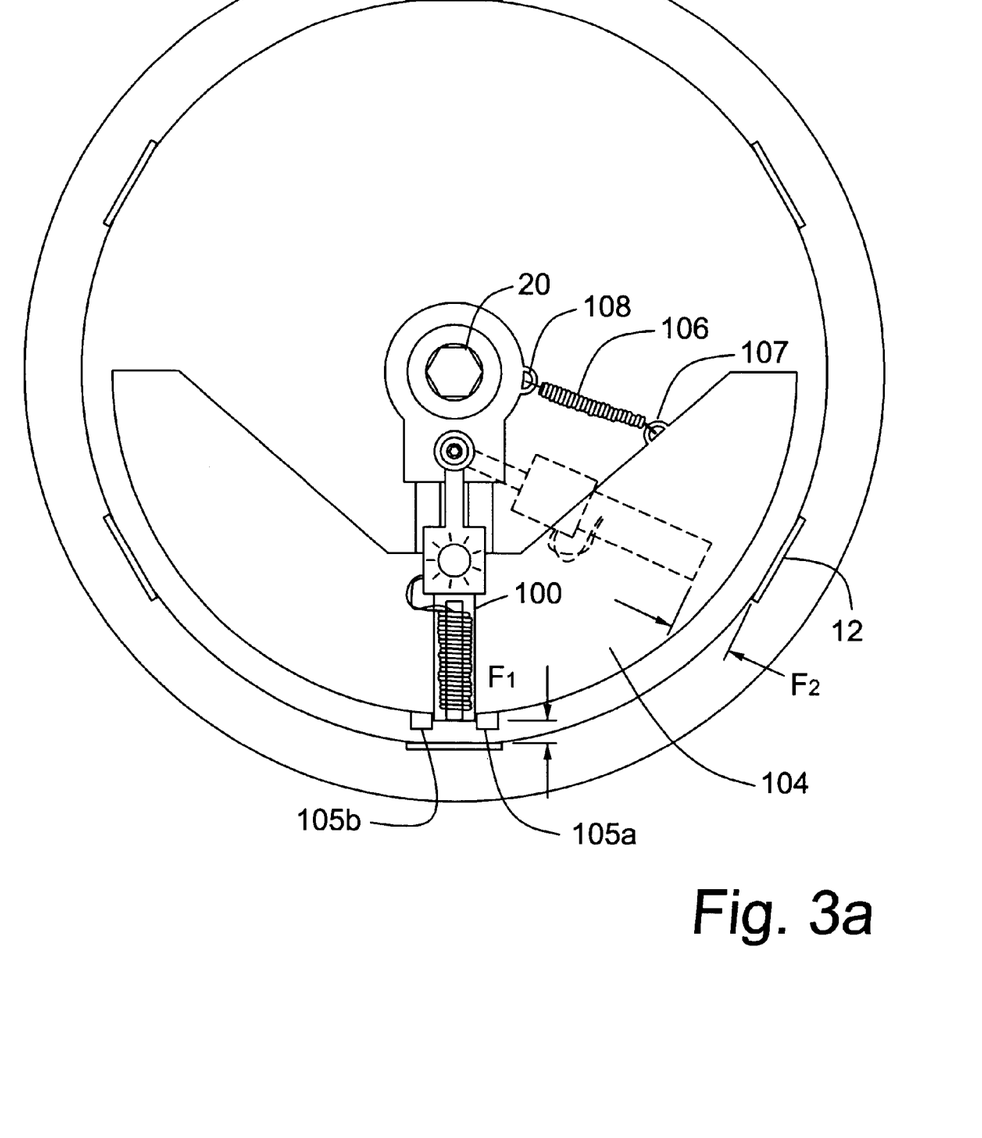
FIG. 3a is a cross-sectional view of the first embodiment of the rail-car status assembly having the lens removed and an optional attachment for the counterweight.

As the solenoid 13 passes through the magnetic field produced by the magnet 12, attraction is induced in the solenoid core 15, which may result in the initiation of co-rotation of the solenoid 13 and arm 100, with the rotating structure R. The arm 100 must be able to resist co-rotation or else the relative magnet 12 and solenoid 13 action is lost. The inertia of the arm may not be sufficient, accordingly, the eccentric axis of rotation about which the arm 100 pivots, results in the arm 100 having a shorter arc of rotation A than the rotating structure R. As shown in FIG. 2b and FIG. 3a (shown in dotted lines), as the arm 100, moves along its shorter arc of rotation A and the distance from the magnets is increased, the force of attraction F1 becomes less at F2. The diminished attraction F2 overcomes the co-rotation that might otherwise occur.

The eccentric mounting limits magnetic attraction to stop the attraction from causing the rotating and non-rotating parts to rotate together and also separates magnetic drag from bearing drag therefore lessening the opportunity for rotating and non-rotating parts to rotate together.

In operation, the housing 2 and attached magnet 12 rotate with the axle 5. The eccentric mounting structure 30 and arm 100 are non-rotating while the inner race 25 and housing 2 rotate. The positioning of the solenoid 13 and magnet 12 are such that the solenoid 13 will pass through the magnetic field created by the magnet 12, inducing a momentary current in the windings of the coil 16. As shown in FIG. 2a and 3a, the magnet 12 is positioned on the circumferential wall 8 and the solenoid 13 is located at the bottom of the arm 100.

The LEDs 10 are secured to non-rotating arm 100 and are positioned so that the emitted light is visible from without the housing 2. Accordingly, as shown in FIG. 2a, the LEDs 10 are mounted near the outer race 27 so as to be visible through lens 4 to motorists and pedestrians. Optionally, a fresnel lens may be placed in front of the LED 10 or replace the lens 4 in the housing 2, to capture and magnify the LED output.

Figure 3B:
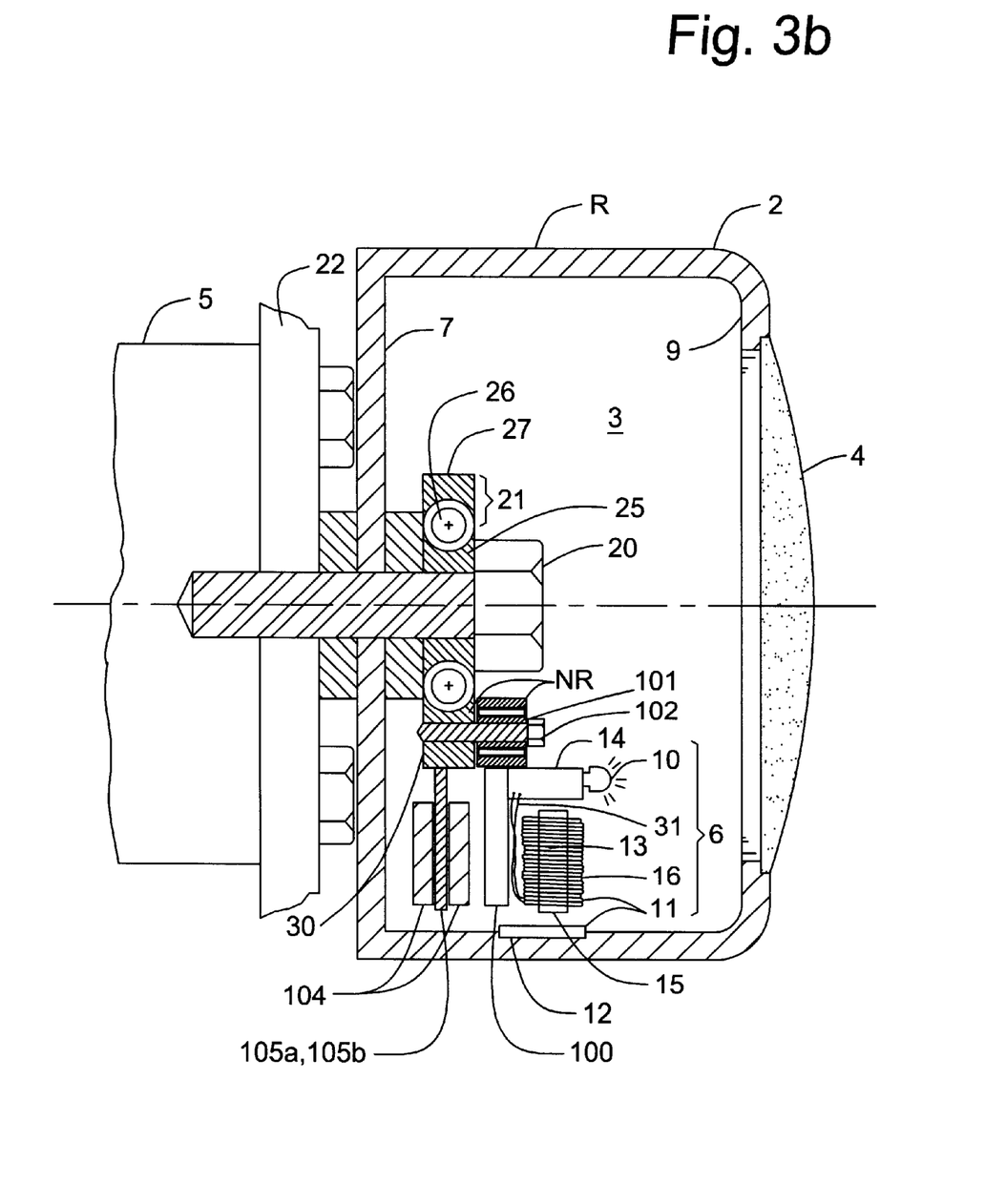

As shown in FIGS. 3a and 3b, the counterweight 104 can be mounted to the eccentric mounting structure using one or more slide bars 105*a*, 105*b*. Bores are drilled through the counterweight through which the slide bars 105*a*, 105*b* are passed. The counterweight is free to move up and down the slide bars 105*a*,105*b*. A spring 106 is connected at a first end 107 to the counterweight 104 and at a second end 108 to the non-rotating eccentric mounting structure 30. If the non-rotating structure NR is frictionally induced to co-rotate, the spring 106 limits the co-rotation and causes the counterweight and eccentric mounting structure to return to a small arcuate pendulous motion.

Alternatively, the spring 106 connecting the counterweight 104 to the non-rotating eccentric mounting structure 30, can be replaced by a spring or rubber cushions (not shown) attached to the slide bars 105*a*, 105*b*, to dampen movement of the counterweight 104.

Rotating Housing with Solenoid

Figure 4A:
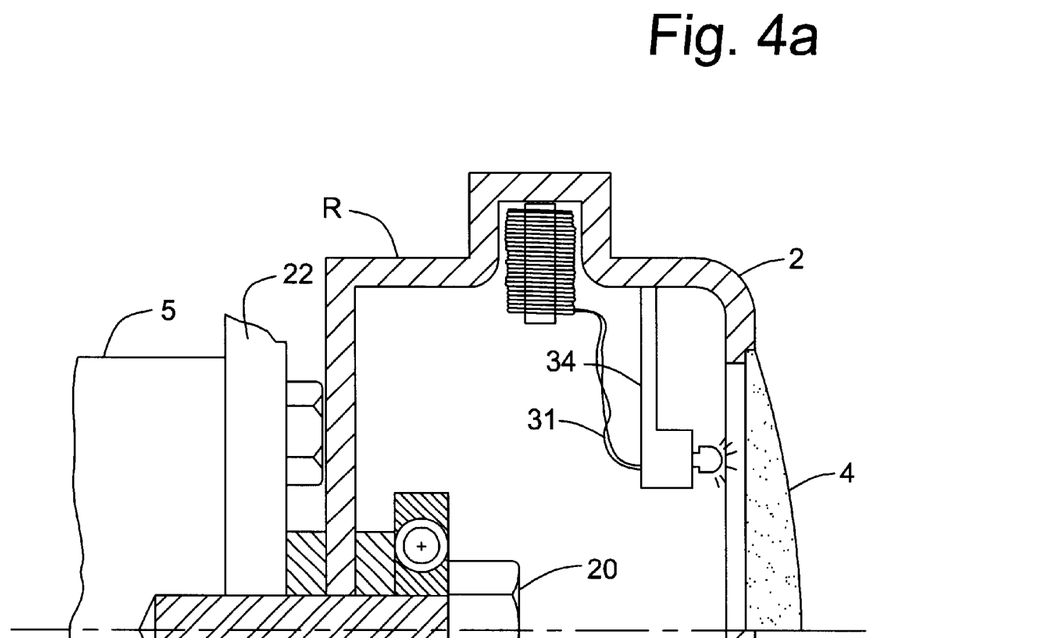
FIGS. 4a and 4b are cross section side views of a second embodiment of the invention, FIG. 4a having a lens and FIG. 4b illustrating a LED mounted directly in the housing.
Figure 4B:
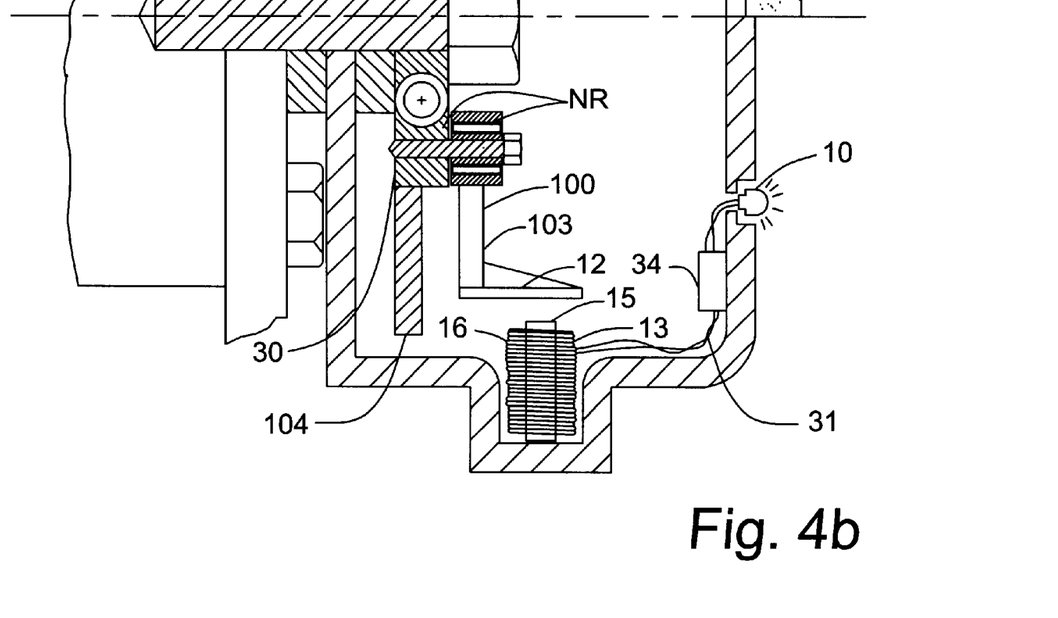

In a second embodiment of the invention shown in FIGS. 4*a* and 4*b*, the arrangement of the solenoid 13 and LEDs 10 are altered. The magnet 12 is affixed to the arm 100 and the housing 2 is again caused to rotate with the axle 5.

One or more solenoids 13 (two shown) are mounted to the circumferential wall 8 of the housing 2, within chamber 3. The solenoids 13 are positioned 180° from each other for balancing the housing 2 during axle rotation.

Magnet 12 is mounted to the bottom end of the arm 103. The magnet 12 is positioned to pass close to solenoids 13, while continuing to allow free rotation of the arm 100 and attached magnet 12. The shortened arc of rotation of the arm A relative to the housing's rotation diminishes the attraction between the magnet 12 and the solenoid core 15, so as to cause the magnet 12 to remain substantially stationary with respect to the rotating housing 2 and attached solenoids 13.

The LEDs 10 are mounted to the housing 2, positioned on suitable brackets 34 adjacent the lens 4 to permit the light to exit the chamber 3 (FIG. 4*a*) or installed in the housing wall to obviate the need for a lens (FIG. 4*b*). The electrical connections 31 between each solenoid 13 and it's associated LEDs 10 are routed from the solenoids 13 to the LEDs 10 along the circumferential 8 wall so as to avoid interfering with the arm 100 and magnet 12.

Optionally, a counterweight 104 is attached to the eccentric mounting structure 30 to assist in preventing co-rotation of the non-rotating structure NR. A spring or rubber cushions (not shown) can be attached between the aarm 100 and non-rotating structures NR to further assist in preventing co-rotation.

Generation of electrical current and mounting of the housing 2 to the axle 5 are the same as that described for the first embodiment.

Non-rotating Housing

Figure 5A:
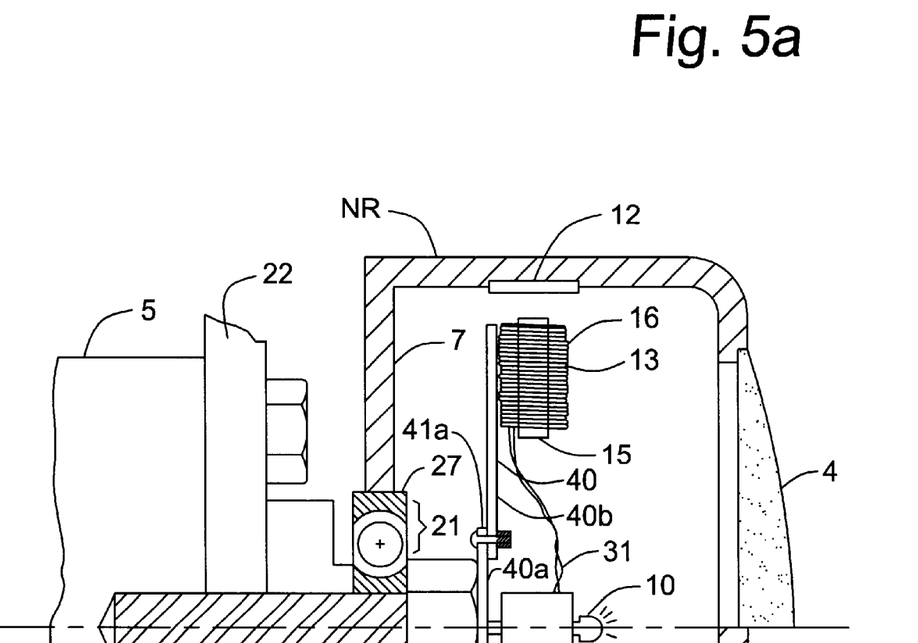
FIGS. 5a and 5b are cross section side views of a third and a fourth embodiment of the invention respectively, FIG. 5a illustrating a magnet mounted in the non-rotating housing and having a lens, and FIG. 5b illustrating a solenoid LED mounted in the non-rotating housing.
Figure 5B:
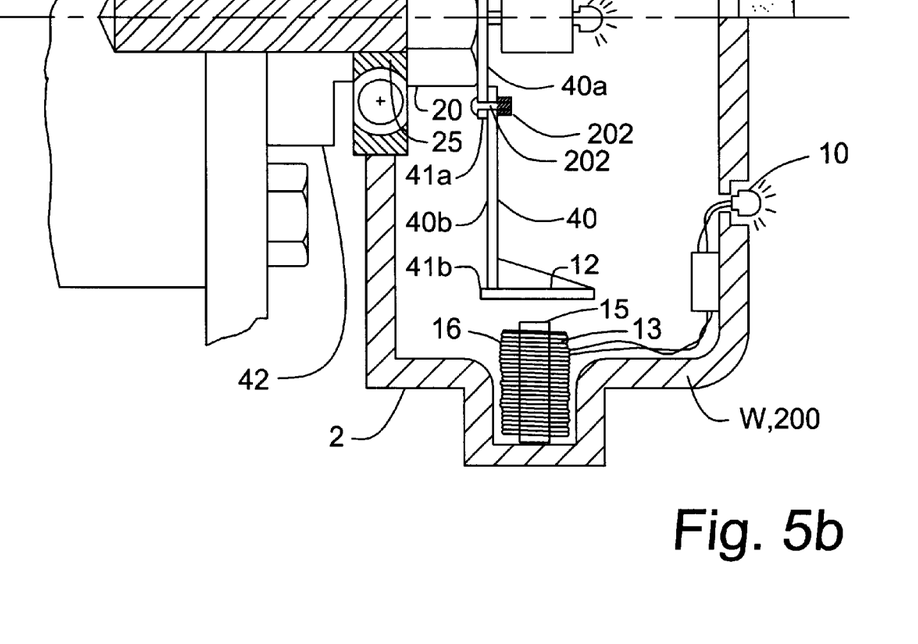

Third and fourth embodiments of the invention are shown in FIGS. 5*a* and 5*b*. In both embodiments the housing 2 is non-rotating NR and acts as a pendulum 200. The axle 5 drives a rotary member 40 comprised of a first section 40*a* having a radial end 41*a* and a second section 40*b* having a radial end 41*b* to which one of the magnet 12 or the solenoid 13 is affixed. Section 40*b* is rotatably connected to the radial end 41*a* of section 40*a*, preferably using a pin 201, creating an eccentric axis of rotation. A spring 202 provides sufficient tension to the connection so as to bias the two sections 40*a*, 40*b* to act as a co-linear rotary member 40. The bearing 21 is mounted to the bolt 20 and the bolt 20 is mounted to the axis of the axle 5. A spacer 42 is sandwiched between the bearing's inner race 25 and the axle endcap 22, to space the housing 2 from the axle 5 or axle endcap 22. The inner race 25 rotates with the axle 5. The rotary member 40 extends diametrically across the axis of the axle 5, mounted to the end of bolt 20.

In the case where magnetic attraction causes the non-rotating weighted housing 2 to begin to rotate with the rotary member 40, the weight of the housing and the magnetic attraction therebetween are sufficient to cause the second section 40*b* of the rotary member to overcome the tension of the spring 202 and rotate about the eccentric axis at pin 201. As described for the embodiment of FIG. 3*a*, the rotation of section 40*b* overcomes the magnetic attraction F1 and, in this case, causes the housing 2 to return to its non-rotating state.

The inside wall 7 of the housing 2 is mounted to the outer race 27 of the bearing 21. The housing 2 is offset weighted W as a pendulum 200, such as a localized thickening of the housing 2, so that the housing 2 is urged by gravity to remain substantially non-rotating regardless of rotation of the axle 5.

In the third embodiment of FIG. 5*a*, the magnet 12 is attached to the circumferential wall 8 of the housing 2 and one or more solenoids 13 are mounted to the radial ends 41 of the rotary member 40. Preferably the solenoids 13 are positioned to balance the rotary member 40 or optionally, balancing weights can be used (not shown). As before, the solenoid 13 is positioned to pass through the magnetic field created by the magnet 12 to induce a current in the solenoid's coil 16.

The LEDs 10 are attached to the rotary member 40 or axle 5 so that the light is emitted outward through the housing lens 4. The electrical connections 31, between the solenoid 13 and the LEDs 10, lie along the rotary member 40.

In the fourth embodiment of FIG. 5*b*, the one or more solenoids 13 are attached to the circumferential wall 8 of the housing 2 and one or more magnets 12 are mounted to the radial ends 41 of the rotary member 40. The magnets 12 and rotary member 40 are balanced. As before, the one or more magnets 12 are positioned so as to pass adjacent each solenoid 13 for inducing current in each solenoid's coil 16. In this embodiment, as shown also for the second embodiment (FIG. 4*b*), flexibility is provided in mounting the LEDs 10, be it behind a lens 4 (FIG. 4*a*) or directly in the housing 2 (FIGS. 4*b* & 5*b*).

Figure 6:
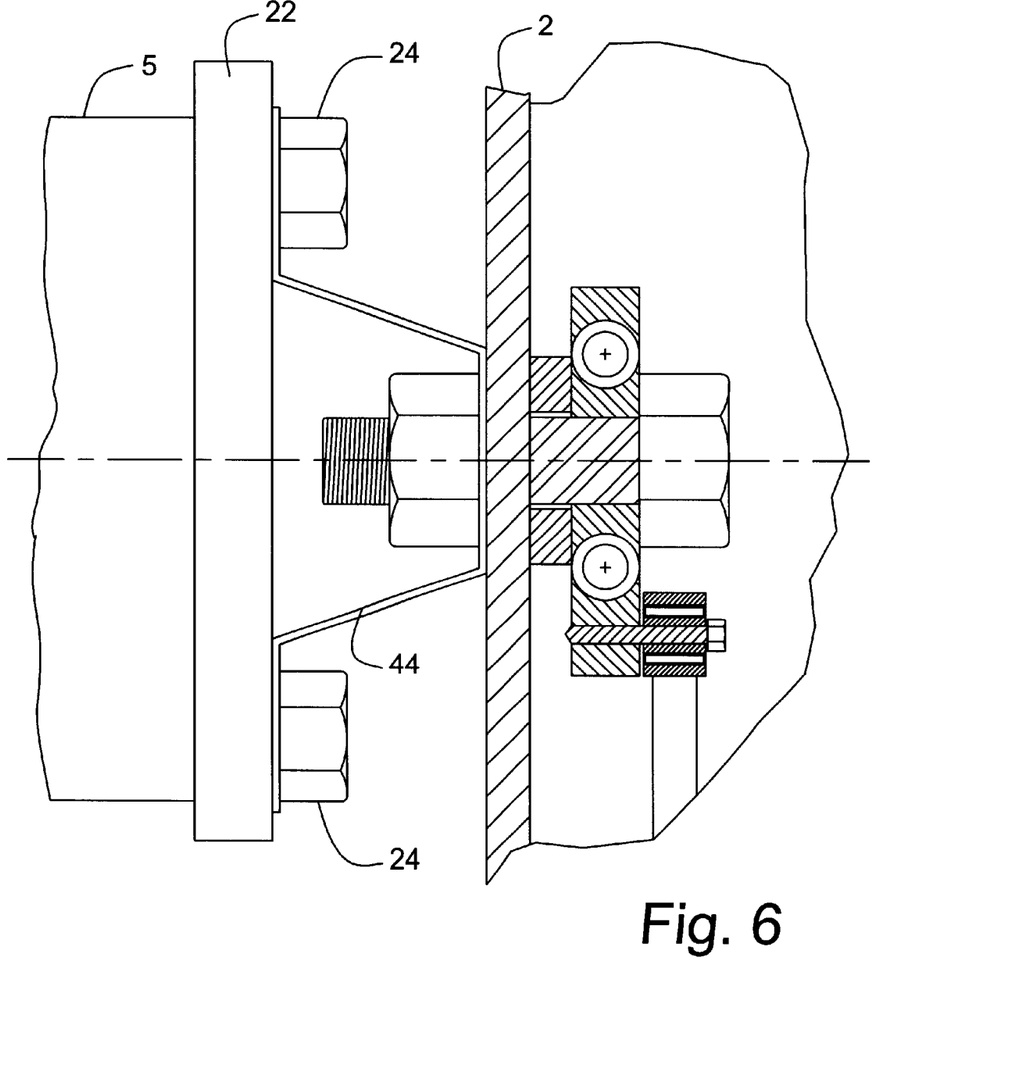
FIG. 6 is partial cross-sectional side view of an optional bracket installation for mounting the rail-car status assembly to the railcar axle.

FIG. 6 illustrates an alternate means for attaching the warning light assembly 1. The housing 2 can be mounted to the rotating endcap 22 using a bracket 44. As the endcap 22 is removable by removing the endcap bolts 24, the bracket 44 can be installed by removing and reinstalling the endcap's bolts 24.

Thus, as described above, the warning light assembly 1 is easily mounted to the axles 5 of railcar wheels. It is relatively simple and inexpensive to construct. The induction system 11 generates sufficient electrical current to light LEDs 10 and warn oncoming motorists of the presence of the train. The enclosed and robust design ensures low maintenance and dependability.

Figure 7:
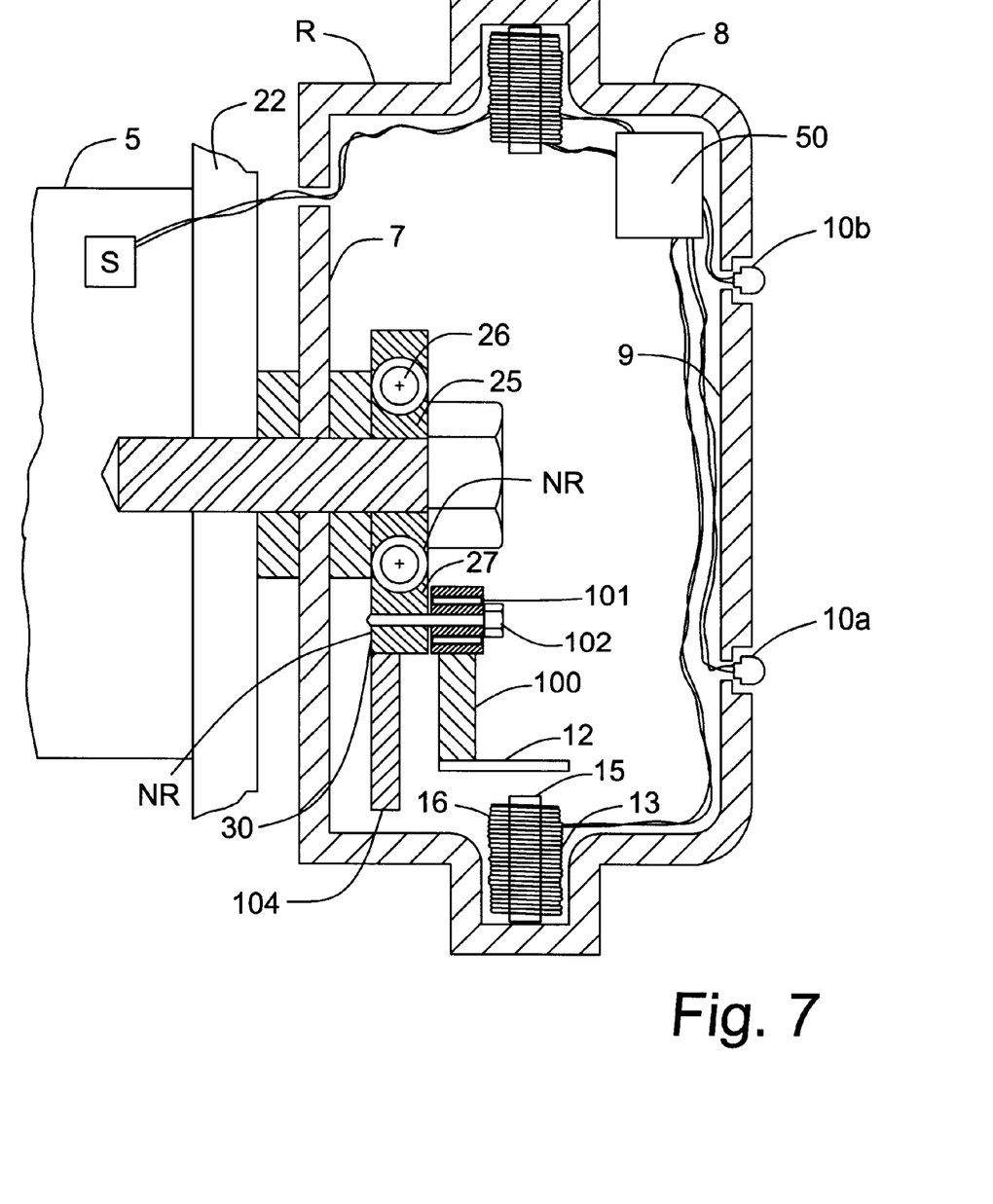
FIG. 7 is a cross section side view of an alternate embodiment of the invention, illustrating a temperature sensor, status electronics powered from the solenoid and status LEDs mounted directly in the housing.

Having reference to FIG. 7, in an alternate embodiment, temperature or vibration sensors S are provided and are powered from the solenoid's coils 16. The sensor emits a signal which indicates the status of a characteristic of the railcar, such as vibration in a bearing or its temperature. For instance, for low-power sensing of temperature, it is known to use a thermoelectric linear array of nickel-iron/chromium micro-thermocouples, connected in series on a thin micro-bridge of silicon nitride. In U.S. Pat. No. 5,677,533 to Yaktine et al., it is disclosed to operate this low power thermoelectric array using batteries. In the present invention there is no need for batteries to monitor the sensor. The status of the temperature or other characteristics of the rail car is monitored using a small low power circuit 50. When a predetermined threshold is reached, indicating a change in status, the status change can be transmitted via one or more indicators which are capable of two or more status conditions. A single multi-color LED (not shown) can provide distinct light indicating, for example, both a "Good" or "Check" status light. An infrared LED can provide a "Good" or "Check" status.

Multiple LEDs 10a, 10b can provide substantially continuous lighted indication of the status. For example, if the sensor S senses temperature exceeding a certain set point, the circuit 50 triggers one of LED 10a or LED 10b. Using a simple light-detector, incorporated in a track-side hot box detector, the status of the axle or other characteristic can be communicated and obviate the need for a more complex heat-sensor.

Similarly and alternatively, the circuit 50 can actuate simple infrared or RF communications in a burst for communication to RF receivers located in periodically encountered hot box detectors or on the train itself. Where the means for receiving the device status is remote or only is accessed periodically (such as a complementary track-side hot box detector), the means for transmitting the device status can be supported with a long life battery power supply. A battery (not shown), such as a lithium ion battery having a shelf life in the order of a decade, can remain dormant, actuated by the circuit 50 only when sensor S reaches the threshold for a change of status. For example, the sensor S is monitored by the circuit 50 under power of the induction system 11, and when the circuit detects the change of status, the battery is engaged to power the status indicator on an ongoing basis.

The Embodiments of the invention for which an exclusive property or privilege is claimed are defined as follows:

1. A rail-car status-indicating assembly which mounts to the rotating axle of a railcar comprising:
   a rotating structure mounted to the axis of the rail-car axle;
   a non-rotating structure connected with a first bearing to the rotating structure about the axis of rotation of the rail-car axle, the non-rotating structure having an offset mass connected to and depending radially therefrom, gravity acting on the offset mass to resist co-rotation of the non-rotating and rotating structures;
   an arm, pivotally connected to the non-rotating mounting structure at a position offset from the axis of rotation of the axle, and extending radially to a bottom end, the bottom end of the arm having a shorter arc of rotation than the rotating structure;
   a magnet and a solenoid mounted to one of either the arm's bottom end or the rotating structure and arranged so that the solenoid repeatedly passes through the magnetic field of the magnet as the axle rotates, inducing electrical energy in the solenoid; and
   a low-power status-indicating device connected electrically to the solenoid so that the induced electrical energy causes the low-power status-indicating device to operate.

2. The rail-car status-indicating assembly as described in claim 1 further comprising a housing forming a chamber which excludes contaminants, the magnet and solenoid being mounted to their respective rotating or non-rotating structure so as to be housed protectively within the chamber.

3. The rail-car status-indicating assembly as described in claim 2 wherein:
   (a) the housing forms the rotating structure and the magnet is mounted thereto;
   (b) the solenoid is mounted to the arm's bottom end so that the housing and the magnet rotate repeatedly past the substantially non-rotating solenoid for inducing electrical energy.

4. The rail-car status indicating assembly as described in claim 1 wherein a counterweight depends slidably from the non-rotating mounting structure and is elastically biased towards the axis.

5. The rail-car status-indicating assembly as described in claim 3 wherein the low-power status device is a light-emitting device connected electrically to the solenoid so that the induced electrical energy causes the light-emitting device to emit visible light.

6. The rail-car status-indicating assembly as described in claim 5 wherein the housing has a translucent lens for passing light so that the emitted light is visible from outside the housing.

7. The rail-car status-indicating assembly as described in claim 6 wherein the light emitting device is one or more light emitting diodes electrically connected to the solenoid.

8. The rail-car status-indicating assembly as described in claim 3 wherein the housing and bearing means are mounted rotatably to the axle by passing a bolt through the bearing means and threading it into the axis of the axle.

9. The rail-car status-indicating assembly as described in claim 3 wherein the housing and bearing means are mounted rotatably to the axle by passing a bolt through the bearing means and threading it into a bracket, the bracket being mounted to the axle.

10. The rail-car status-indicating assembly as described in claim 2 wherein:
    (a) the housing forms the rotating structure and the solenoid is mounted thereto;
    (b) the magnet is mounted to the first end of the arm so that the housing and the solenoid rotate repeatedly past the substantially non-rotating magnet for inducing electrical energy.

11. The rail-car status-indicating assembly as described in claim 10 wherein the light emitting device is mounted to the housing so that the emitted light is visible from outside the housing.

12. The rail-car status-indicating assembly as described in claim 2 wherein
    (a) the housing forms the non-rotating structure and is offset weighted for forming a pendulum, and the magnet is mounted thereto;
    (b) the solenoid is mounted to the rotating structure so that the solenoid is repeatedly rotated past the substantially non-rotating magnet for inducing electrical energy.

13. The rail-car status-indicating assembly as described in claim 12 wherein the housing has a translucent lens for passing light so that the emitted light is visible from outside the housing.

14. The rail-car status-indicating assembly as described in claim 2 wherein:
    (a) the housing forms the non-rotating structure and is offset weighted for forming the pendulum, the solenoid being mounted thereto;
    (b) the magnet is mounted to the rotating structure so that the magnet is repeatedly rotated past the substantially non-rotating solenoid for inducing electrical energy.

15. The rail-car status-indicating assembly as described in claim 14 wherein the light emitting device is mounted to the housing so that the emitted light is visible from outside the housing.

16. A system for determining the status of a rail-car comprising:

an onboard low power generator having a rotating structure mounted to the axis of a railcar axle and a non-rotating structure, bearing means for rotatably supporting the non-rotating structure from the rotating structure, a pendulum connected to and extending radially from the non-rotating structure, gravity acting on the pendulum to prevent substantial rotation thereof and a magnet and a solenoid mounted to one of either the rotating or the non-rotating structures and arranged so that the solenoid repeatedly passes through the magnetic field of the magnet as the axle rotates, inducing electrical energy in the solenoid;

an onboard sensor for determining and emitting a signal characteristic of the railcar;

a low-power status-indicating device providing at least two status indications, the device being connected electrically to the solenoid so that the induced electrical energy causes the low-power status-indicating device to indicate the status of the railcar characteristic;

means for transmitting the device status; and means for receiving the device status.

17. The system of claim 16 wherein the low-power status-indicating device is a light emitting device and at least one of the two status indications is emission of light from the device.

18. The system of claim 17 wherein the low-power status-indicating device is a light emitting device and at least two of the status indications is two different colors of light from the device.

19. The system of claim 18 further comprising light sensing means for receiving the device's status.

20. The system of claim 19 wherein the light sensing means is incorporated in a hot box detector.

21. The system of claim 16 wherein the low-power status-indicating device is a RF transmitter.

22. The system of claim 21 further comprising a battery having a long shelf life which is actuated only upon actuation of the RF transmitter.

23. The system of claim 22 further comprising RF receiving means for receiving the device's status.

24. The system of claim 23 wherein the RF receiving means is incorporated in a hot box detector.

25. A rail-car status-indicating assembly which mounts to the rotating axle of a railcar comprising:

a rotating structure mounted to the axis of the railcar axle;

a non-rotating structure;

bearing means for rotatably supporting the non-rotating structure from the rotating structure;

offset mass connected to and depending radially from the non-rotating structure, gravity acting on the offset mass to resist substantial rotation thereof;

a magnet and a solenoid each mounted to one of either the rotating or the non-rotating structures and arranged so that the solenoid repeatedly passes through the magnetic field of the magnet as the axle rotates, repeatedly and periodically inducing electrical energy in the solenoid; and a light-emitting device connected electrically to the solenoid so that the induced electrical energy causes the light-emitting device to emit visible light.

26. The rail-car status-indicating assembly as described in claim 25 further comprising a housing forming a chamber which excludes contaminants, the magnet and solenoid being mounted to their respective rotating or non-rotating structure so as to be housed protectively within the chamber.

* * * * *